(12) United States Patent
Baird

(10) Patent No.: US 12,222,110 B2
(45) Date of Patent: Feb. 11, 2025

(54) GRILLING SYSTEM

(71) Applicant: Cory A. Baird, Tampa, FL (US)

(72) Inventor: Cory A. Baird, Tampa, FL (US)

(73) Assignee: Cory A. Baird, Tampa, FL (US)

( * ) Notice: Subject to any disclaimer, the term of this patent is extended or adjusted under 35 U.S.C. 154(b) by 657 days.

(21) Appl. No.: 17/390,098

(22) Filed: Jul. 30, 2021

(65) Prior Publication Data

US 2023/0035347 A1 Feb. 2, 2023

(51) Int. Cl.
| | |
|---|---|
| *F24C 15/32* | (2006.01) |
| *A47J 37/06* | (2006.01) |
| *A47J 36/00* | (2006.01) |
| *A47J 37/07* | (2006.01) |
| *F24B 1/182* | (2006.01) |

(52) U.S. Cl.
CPC ............... *F24C 15/32* (2013.01); *A47J 37/06* (2013.01); *A47J 36/00* (2013.01); *A47J 37/07* (2013.01); *A47J 37/0718* (2013.01); *A47J 37/0768* (2013.01); *A47J 37/0786* (2013.01); *F24B 1/182* (2013.01)

(58) Field of Classification Search
CPC ........ A47J 37/06; A47J 37/07; A47J 37/0768; A47J 36/00; A47J 37/0718; A47J 37/0786; F24B 1/182; F24C 15/32

USPC ................................................. 126/21 R, 1 R
See application file for complete search history.

(56) References Cited

U.S. PATENT DOCUMENTS

| | | | | |
|---|---|---|---|---|
| 3,123,062 | A * | 3/1964 | Psarris ................. | A47J 37/079 126/25 B |
| 5,655,435 | A * | 8/1997 | Rachesky ........... | A47J 37/0704 99/449 |
| 6,202,637 | B1 * | 3/2001 | Roberts .................... | A47J 27/10 126/20 |
| 2010/0218754 | A1 * | 9/2010 | Kuntz ................. | A47J 37/0786 126/25 R |

* cited by examiner

*Primary Examiner* — Steven B Mcallister
*Assistant Examiner* — Benjamin W Johnson
(74) *Attorney, Agent, or Firm* — Mark Malek; Jonathan Staudt; Widerman Malek. PL

(57) ABSTRACT

A grill system is disclosed and may include a grate comprising a plurality of grill members. The grate may include a stationary region and a chute aperture. The grill system may further include a chute comprising a chute top portion and a chute bottom portion. The chute may engage the grate by traversing through the chute aperture. The perimeter of the chute aperture may be reinforced by a secondary member.

14 Claims, 6 Drawing Sheets

GRILLING SYSTEM

FIELD OF THE INVENTION

Embodiments of this disclosure relate generally to a grilling system and, in particular, a grilling system that allows for heat to be adjusted.

BACKGROUND OF THE INVENTION

Managing the heat source for an open face grill is a cumbersome process. In a typical grill, the heat source comprises a combustible material such as wood or charcoal situated at the bottom of a grill. Above the heat source can be a heat conductive structure such as a grate. The grate can typically be aerated and metallic or some other heat conducting material. As the combustible material burns, the heat, fire, and smoke rise, to cook the food on the grill. However, the heat source has to be managed for the duration of cooking. For example, the surface area of the grate may exhibit uneven heating because the temperature of certain regions on the grill will vary. The variance may be caused by an uneven distribution of the heat source at the bottom of the grill or the thermal energy reserved in the combustible materials being exhausted.

Accordingly, there remains a need for an improved comprehensive and efficient way to address the problem. This need and other needs are satisfied by the various aspects of the present disclosure.

SUMMARY OF THE INVENTION

Some or all of the above needs and/or problems may be addressed by certain embodiments of the disclosure. Certain embodiments of the disclosure can include a grill system for adjusting the heat source of a grill. An embodiment of the grilling system can include a grate comprising a plurality of grill members. The grate can comprise a stationary region and a chute aperture. The grill system can also comprise a chute. The chute can comprise a chute top portion and a chute bottom portion. The chute can engage the grate by traversing through the chute aperture. The perimeter of the perimeter of the chute aperture is reinforced by a secondary member.

BRIEF DESCRIPTION OF THE DRAWINGS

The detailed description is set forth with reference to the accompanying drawings, which are not necessarily drawn to scale.

DETAILED DESCRIPTION OF THE INVENTION

Figure 1:
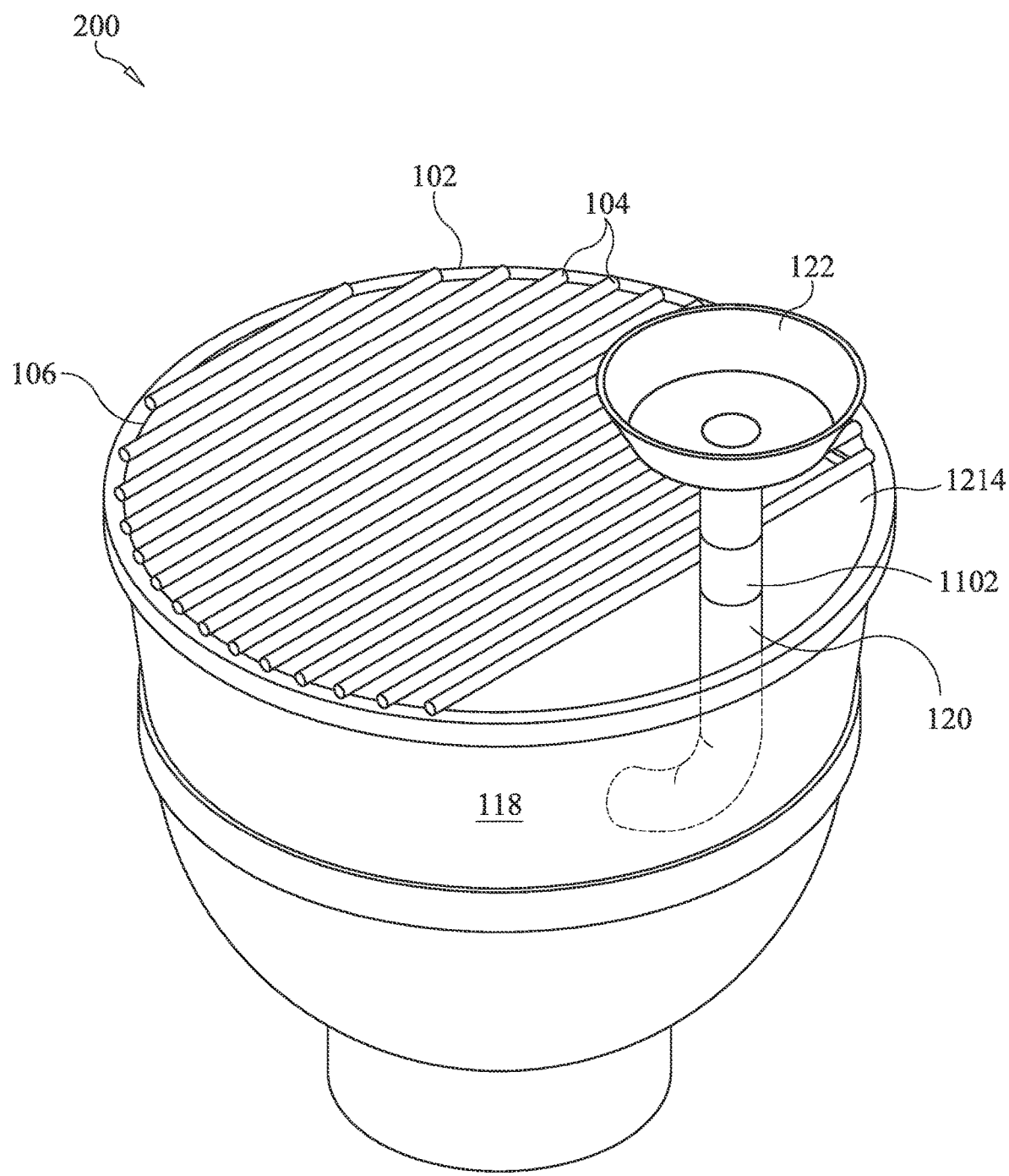
FIG. 1 is a perspective view of the grilling system according to the present invention.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The following description is provided as an enabling teaching of the disclosed articles, systems, and methods in their best, currently known embodiments. To this end, those skilled in the relevant art will recognize and appreciate that many changes can be made to the various aspects of the articles, systems, and methods described herein, while still obtaining the beneficial results of the disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a gasket" can include two or more such gaskets unless the context indicates otherwise.

As used throughout, "substantially" with respect to a measure can refer to a range of values comprising +/−10 degrees. For example, substantially orthogonal, normal, or parallel can include embodiments, where the referenced components are oriented +/−10 degrees of being classified as orthogonal, normal, or parallel respectively.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

FIG. 1 depicts an isometric view of the grilling system 200. The grilling system 200 can comprise a grate 102. In one aspect, the grate 102 can be comprised of a metallic material, such as iron or stainless steel. In another aspect the grate material can be comprised of a material that allows heat to be transferred from a heat source below the grate to food cooking on top of the grate. Structurally, the grate 102 can comprise multiple grill members 104 that span the width of the grate. In other embodiments, grill members 104 can be oriented to span the length of the grate. The grill members 104 can also be of a circular cross-sectional shape. In another embodiment, the cross-sectional shapes of the grill member 104 can be a regular or irregular polygon. As shown in FIGS. 1, 2, and 4-5, the grate 102 has a circular surface area configuration. In an alternate embodiment, the surface area can be configured in other geometric shapes including regular or irregular polygons.

The surface area of the grate 102 can be subdivided into two regions. The first region can be the stationary region 106. The second region is a chute aperture 1214. The chute aperture 1214 can be used as an opening to allow the chute 120 to pass through the grate 102. In an alternative embodiment, the chute aperture 1214 can be located in the stationary region 106. In a further aspect, the chute aperture 1214 can be reinforced by a secondary member 116. The secondary member 116 can reinforce the chute aperture 1214 by outlining the perimeter of the chute aperture 1214. The secondary member 116 of the chute aperture 1214 can also provide a guide railing for the chute 120 to engage while the chute 120 traverses horizontally through the chute aperture 1214. The chute 120 can be used as a transfer path to transport combustible materials from outside the grill into a bowl 118 located at the bottom of the grill system 200. The combustible materials, such as wood chips and/or charcoal can be added to a heat source or serve as the initial heat source. In a further aspect, the chute 120 can comprise a funnel 122 and a chute top portion opening 125 that is extending through the funnel 122.

Figure 2:
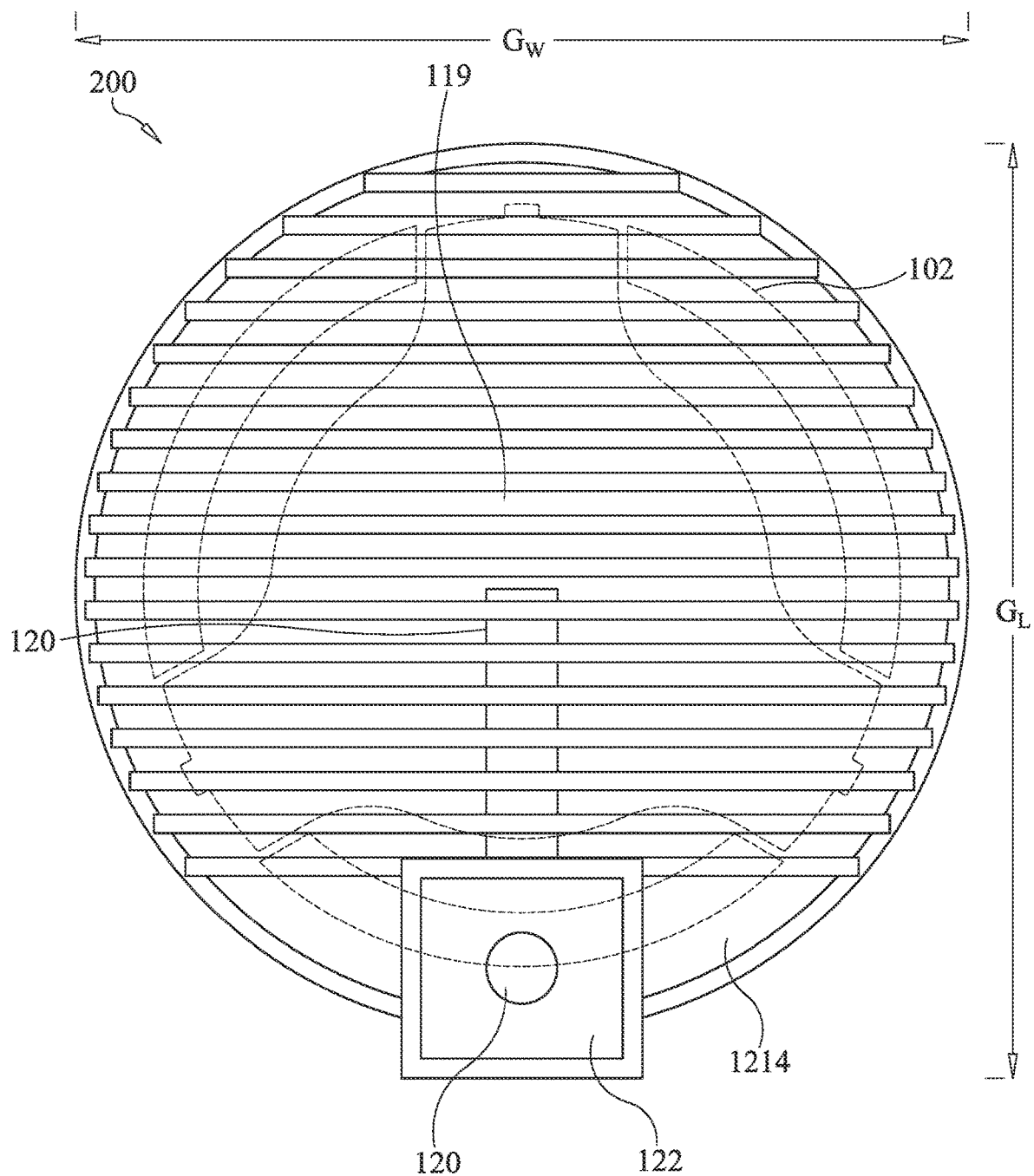
FIG. 2 depicts a top plan view of the grilling system of FIG. 1.
Figure 3:
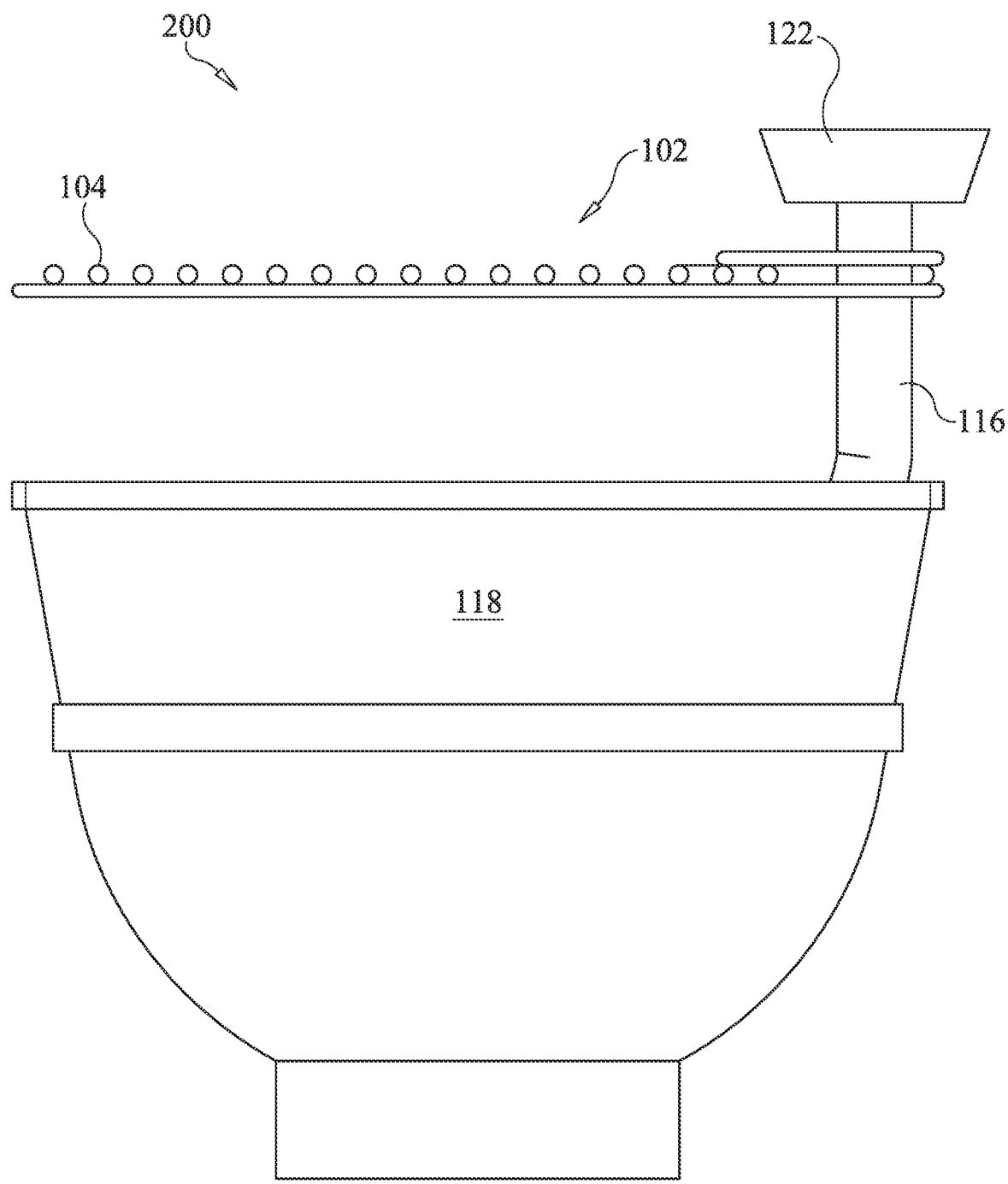
FIG. 3 depicts a side elevation view of the grilling system of FIG. 1.

FIG. 2 depicts a top view, while FIG. 3 depicts a side view of the grilling system 200. In one aspect, the grate length can range between 6 and 24 inches. In another aspect, the grate length ($G_L$) can range between 8 and 18 inches. In a further aspect, the grate length can range between 10 and 16 inches. In one aspect, the grate width ($G_W$) can range between 6 and 24 inches. In another aspect, the grate width can range between 8 and 18 inches. In a further aspect, the grate width can range between 10 and 16 inches.

Although depicted as having a half moon shape, the chute aperture 1214 can comprise a curved shape or any other shape suitable for the chute 120 to be passed through the grate 102. The chute aperture 1214 can be sized to encompass an outer dimension of chute 120. The curved shape of the chute aperture 1214 allows the chute 120 to travel horizontally along a curved path. The curved path allows the user to place the combustible materials in proximity to the interior surface 119 of the bowl 118. In addition to translating the chute horizontally along the curved path, a user can also rotate the chute 120 and funnel 122 around a vertical axis.

Figure 4:
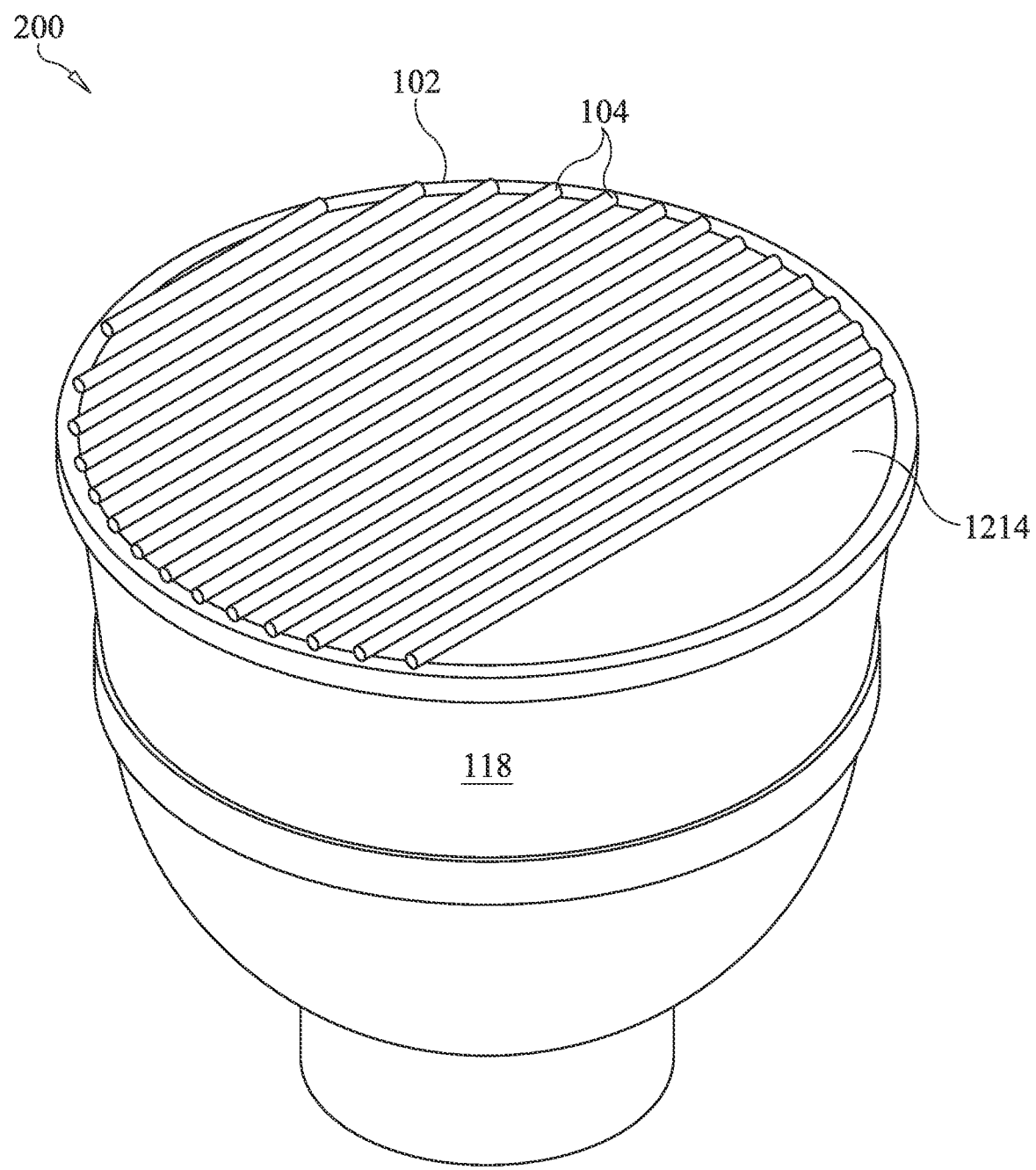
FIG. 4 depicts a perspective view of a partial assembly of the grilling system of FIG. 1.
Figure 5:
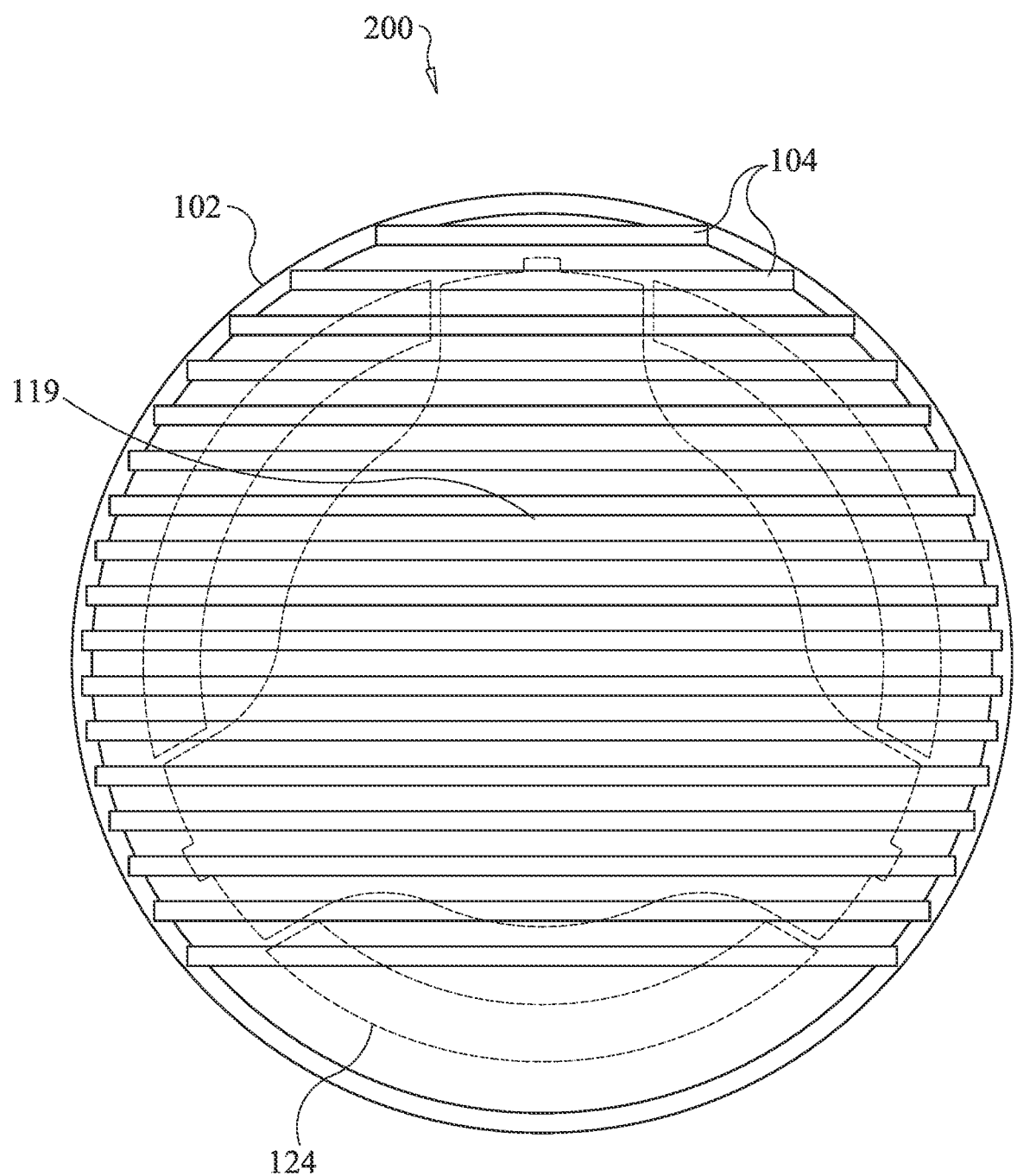
FIG. 5 depicts a top plan view of a partial assembly of the grilling system of FIG. 4.

If the user so chooses, the user can remove the chute 120. For example, as shown in FIG. 4 and FIG. 5, the chute 120 can be removed. After the chute 120 is removed, the user can have access to the bowl 118 and interior surface 119 should the user desire to add a larger amount of combustible materials to the heat source.

Figure 6:
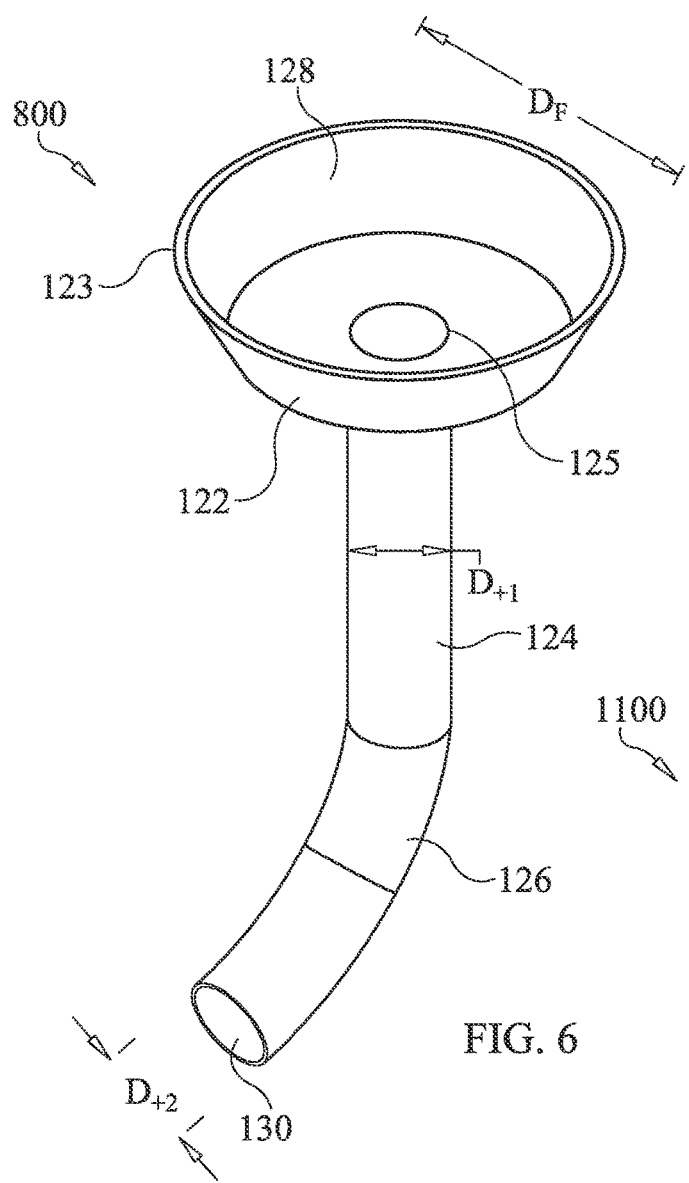
FIG. 6 depicts a perspective view of a chute of the grilling system illustrated in FIG. 1.
Figure 7:
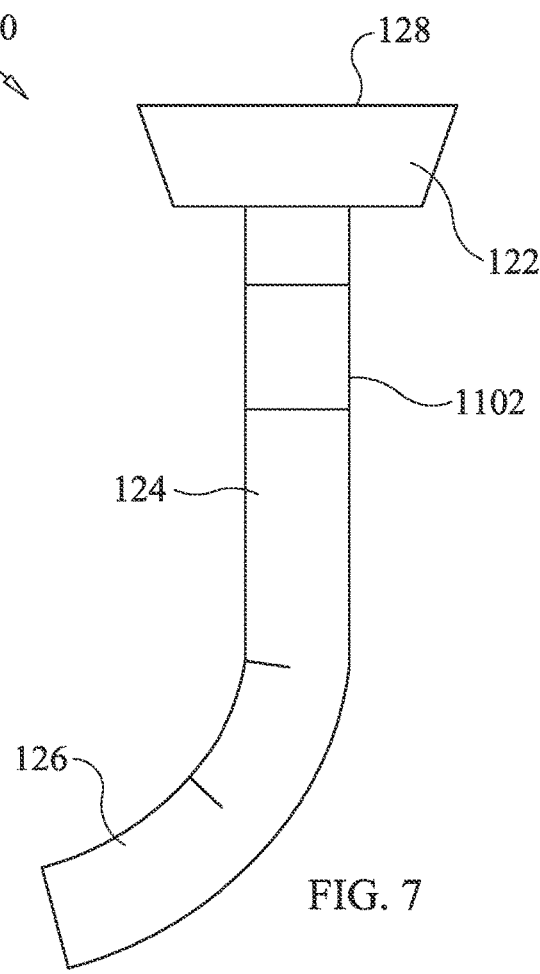
FIG. 7 depicts a side elevation view of the chute illustrated in FIG. 6.

As shown in FIGS. 6 and 7, the alternative embodiment of the chute 800 can have a tubular shape. In the tubular shaped chute, a portion of the internal cross-section can be an annulus 601. In the tubular shaped chute, a portion of the internal cross-section can be an elbow that may be positioned at the chute bottom portion 126. In another aspect, the inner diameter (Dt1) of the chute top portion 124 can initiate at the base of the funnel 122 at the chute top portion opening 125. In one aspect, the inner diameter (Dt1) can range between 1 and 6 inches. In another aspect, the inner diameter (Dt1) can range between 1.5 and 5 inches. Further, the opposite end 123 of the funnel 122 can have a funnel diameter (Df) that is greater than the inner diameter (Dt1) of the chute top portion 124. In one aspect, the inner diameter (Dt1) of the chute top portion 124 can be approximately equal to the inner diameter (Dt2) of the chute bottom portion 126. In yet a further aspect, the inner diameter of the tubular chute 1100 can increase along the path such that the dimension (Dt2) of the chute bottom portion opening 130 is greater than the inner diameter (Dt1) of the chute top portion 124.

As shown in FIG. 7, another embodiment of chute 1100 can have a heat resistant material 1102. In one aspect, heat resistant material 1102 can be located beneath funnel 122 large enough to cover a user's hand size. In further aspect, heat resistant material 1102 can be located beneath funnel 122 and extend the entire chute top portion 124. In further aspect, the entirety of chute 1100 can be comprised of heat resistant material 1102. Heat resistant material 1102 can be affixed to chute 1100 in a plurality of methods. As a nonlimiting example, heat resistant material 1102 can be a sleeve, directly molded to chute 1100, or chute 1100 can be comprised of heat resistant material 1102. The purpose of heat resistant material 1102 is to allow a user to maneuver chute 1100 to disperse the combustible material evenly without risk of burning said user's hand in the process. The heat resistant material 1102 insulates the user's hand from any transferred heat from chute 1100 when engaged with grilling system 100 or grilling system 200. Heat resistant material 1102 can be utilized in any embodiment disclosed herein and is not limited to chute 1100. The embodiments described in this section are for illustrative purposes.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A grill system comprising:
a grate comprising a plurality of grill members, the grate comprising
a stationary region, and
a chute aperture; and
a chute comprising a tubular shape, a chute top portion, and a chute bottom portion;
wherein the chute engages the grate by traversing through the chute aperture;
wherein a perimeter of the chute aperture is outlined and overlayed by a secondary member to guide the chute when the chute traverses through the chute aperture;

wherein the chute aperture defines an end portion of the grate at which none of the plurality of grill members are present thereat;

wherein the chute comprises an elbow shaped to position the chute bottom portion beneath a mid-area of the grate when the chute is engaged with the grate; and wherein the chute top portion is positioned above the chute aperture when the chute is engaged with the grate.

2. The grill system of claim 1, wherein an internal diameter of the chute increases along a path originating at the chute top portion and ending at the chute bottom portion.

3. The grill system of claim 1, wherein the chute further comprises a funnel coupled in proximity to an opening of the chute top portion.

4. The grill system of claim 1, wherein the perimeter of the chute aperture comprises a curved portion.

5. The grill system of claim 1, wherein the chute further comprises a heat resistant material.

6. A grill system comprising:
a grate comprising a plurality of grill members, wherein the grate defines a chute aperture; and
a chute comprising a tubular shape, a chute top portion, and a chute bottom portion;
wherein the chute engages the grate by traversing through the chute aperture;
wherein a perimeter of the chute aperture is outlined and overlayed by a secondary member to guide the chute when the chute traverses through the chute aperture;
wherein the chute aperture defines an end portion of the grate at which none of the plurality of grill members are present thereat;
wherein the chute comprises an elbow shaped to position the chute bottom portion beneath a mid-area of the grate when the chute is engaged with the grate; and
wherein the chute top portion is positioned above the chute aperture when the chute is engaged with the grate.

7. The grill system of claim 6, wherein an internal diameter of the chute increases along a path originating at the chute top portion and ending at the chute bottom portion.

8. The grill system of claim 6, wherein the chute further comprises a funnel coupled in proximity to an opening of the chute top portion.

9. The grill system of claim 6, wherein the perimeter of the chute aperture comprises a curved portion.

10. The grill system of claim 6, wherein the chute further comprise a heat resistant material.

11. A grill system comprising:
a grate comprising a plurality of grill members, a stationary region, and a chute aperture formed in the stationary region; and
a chute comprising a chute top portion and a chute bottom portion and positioned to engage the grate by traversing through the chute aperture;
wherein the chute comprises a tubular shape, to define a tubular shaped chute;
wherein a portion of the chute cross-sectional area comprises an elbow;
wherein the tubular shaped chute comprises a funnel coupled in proximity to an opening of the chute top portion;
wherein an internal diameter of the tubular shaped chute increases along a path originating at the chute top portion and ending at the chute bottom portion;
wherein the chute aperture defines an end portion of the grate at which none of the plurality of grill members are present thereat;
wherein the elbow is shaped to position the chute bottom portion beneath a mid-area of the grate when the tubular shaped chute is engaged with the grate; and
wherein the chute top portion is positioned above the chute aperture when the tubular shaped chute is engaged with the grate.

12. The grill system of claim 11, wherein the perimeter of the chute aperture comprises a curved portion.

13. The grill system of claim 11, wherein the tubular shaped chute further comprises a heat resistant material.

14. The grilling system of claim 11, further comprising a secondary member overlaying and outlining a perimeter of the chute aperture to guide the tubular shaped chute when the tubular shaped chute traverses through the chute aperture.

* * * * *